US007117197B1

(12) United States Patent
Wong et al.

(10) Patent No.: US 7,117,197 B1
(45) Date of Patent: ***Oct. 3, 2006

(54) SELECTIVELY AUDITING ACCESSES TO ROWS WITHIN A RELATIONAL DATABASE AT A DATABASE SERVER

(75) Inventors: Daniel ManHung Wong, Sacramento, CA (US); Chon Hei Lei, Alameda, CA (US); Patrick F. Sack, Ashburn, VA (US)

(73) Assignee: Oracle International Corp., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/559,171

(22) Filed: Apr. 26, 2000

(51) Int. Cl.
*G06F 17/30* (2006.01)
(52) U.S. Cl. .............................. 707/3; 707/10; 707/100
(58) Field of Classification Search ................... 707/3, 707/4, 8, 9, 10, 204, 100
See application file for complete search history.

(56) References Cited

U.S. PATENT DOCUMENTS

| 5,519,859 | A | * | 5/1996 | Grace .............................. 707/3 |
| 5,625,815 | A | * | 4/1997 | Maier et al. ..................... 707/8 |
| 5,794,252 | A | * | 8/1998 | Bailey et al. ............... 707/202 |
| 5,799,323 | A | * | 8/1998 | Mosher et al. .............. 707/202 |
| 6,023,509 | A | | 2/2000 | Herbert et al. ................. 380/25 |
| 6,041,310 | A | * | 3/2000 | Green et al. ................... 705/27 |
| 6,064,951 | A | * | 5/2000 | Park et al. ................... 707/536 |
| 6,351,753 | B1 | * | 2/2002 | Jagadish et al. ............. 707/203 |
| 6,553,392 | B1 | * | 4/2003 | Mosher et al. .............. 707/204 |
| 6,584,477 | B1 | * | 6/2003 | Mosher, Jr. .................. 707/204 |
| 2003/0014394 | A1 | | 1/2003 | Fujiwara et al. ............... 707/3 |
| 2005/0257272 | A1 | * | 11/2005 | Nakao .......................... 726/26 |

FOREIGN PATENT DOCUMENTS

JP        WO9912144          3/1999

OTHER PUBLICATIONS

Elmasri et al. (Fundamentals Of Database System), Copy right 2000, p. 252-253.*

(Continued)

*Primary Examiner*—Jean M. Corrielus
*Assistant Examiner*—Baoquoc N. To
(74) *Attorney, Agent, or Firm*—Park, Vaughan & Fleming LLP

(57) ABSTRACT

One embodiment of the present invention provides a system that selectively audits accesses to a relational database system. This system starts by receiving a query from a client at a database server. The system processes this query at the database server to produce a query result. The system also creates an audit record for rows in relational tables that are accessed by the query, and that satisfy an auditing condition. Next, the system records the audit record in an audit record store and returns the query result to the client. Integrating the auditing facility into the relational database system in this manner ensures that auditing is performed in the same way regardless of which application generates the query. Furthermore, this auditing is transparent to applications and users. In one embodiment of the present invention, the system additionally modifies the query so that processing the query causes the audit record to be created and recorded for rows in relational tables that are accessed by the query and that satisfy the auditing condition. In a variation on this embodiment, the auditing condition is associated with a table in the relational database system.

27 Claims, 3 Drawing Sheets

OTHER PUBLICATIONS

PLattini et al. Secure database: state of the art, Security Technogy, 2000, date Oct. 23-25, 2000, p. 228-237.*

John L. Berg. Data base directions: the next steps, ACM SIGMOS, ACM Press, date Nov. 1976.*

Publication: "Access control in a relational data base management system by query modification" by Stonebraker and Wong, Proc. ACM Ann. Conf. San Diego, CA, Nov. 1974, pp. 180-187.

* cited by examiner

SELECTIVELY AUDITING ACCESSES TO ROWS WITHIN A RELATIONAL DATABASE AT A DATABASE SERVER

RELATED APPLICATION

The subject matter of this application is related to the subject matter in a co-pending non-provisional application by inventor Daniel ManHung Wong, filed on the same day as the instant application entitled, "Reforming Queries to Selectively Audit Accesses to Rows Within a Relational Database," having Ser. No. 09/559,206, and filing date Apr. 25, 2000.

BACKGROUND

1. Field of the Invention

The present invention relates to providing security in computerized databases. More specifically, the present invention relates to a method and an apparatus for selectively auditing accesses to relational database tables based upon auditing conditions.

2. Related Art

Databases commonly store highly sensitive data, such as salaries, corporate financial data, and even classified military secrets. For security reasons it is essential to be able to audit accesses to this sensitive data. Conventional database systems typically provide a general auditing facility that records an audit trail containing general information about the user and the query issued.

However, conventional auditing facilities have a number of shortcomings. They do not record specific information about the application, the session environment or most importantly, the query results. Consequently, information gathered by a conventional auditing facility is frequently insufficient to reconstruct an event, or even to determine whether access rights have been violated.

In conventional relational database systems, auditing facilities only record information regarding which tables are accessed, not whether certain rows inside a given table are accessed. This table-level auditing tends to generate a large number of false audit records because many accesses to a given table do not touch sensitive data.

What is needed is an auditing mechanism that can specify a finer granularity of audit conditions during accesses to relational tables in order to minimize the number of false audit records that are generated.

Another problem in auditing database accesses arises in distributed database architectures, in which an application located on an application server sends a query to a database located on a database server. In this type of distributed architecture, auditing is typically performed by embedding customized auditing mechanisms into the application on the applications server, not at the database server. Relying on the application to perform auditing can give rise to many problems because a large number of applications can potentially access the database. Consequently, it is almost impossible to ensure that each one of these applications is configured to perform the auditing properly.

What is needed is an auditing mechanism for database accesses which does not rely on applications outside of the database server to perform auditing.

SUMMARY

One embodiment of the present invention provides a system that selectively audits accesses to a relational database system. This system starts by receiving a query from a client at a database server. The system processes this query at the database server to produce a query result. The system also creates an audit record for rows in relational tables that are accessed by the query, and that satisfy an auditing condition. Next, the system records the audit record in an audit record store and returns the query result to the client. Integrating the auditing facility into the relational database system in this manner ensures that auditing is performed in the same way regardless of which application generates the query. Furthermore, this auditing is transparent to applications and users.

In one embodiment of the present invention, the system additionally modifies the query so that processing the query causes the audit record to be created and recorded for rows in relational tables that are accessed by the query and that satisfy the auditing condition. In a variation on this embodiment, the auditing condition is associated with a table in the relational database system.

In one embodiment of the present invention, the auditing condition includes a plurality of auditing conditions.

In one embodiment of the present invention, the audit record includes a user name for a user making the query, a time stamp specifying a time of the query, and a text of the query.

In one embodiment of the present invention, the system determines if auditing is enabled, and if so, creates the audit record.

In one embodiment of the present invention, auditing is enabled on a table by table basis.

In one embodiment of the present invention, the audit record is created while the query result is being generated.

In one embodiment of the present invention, the audit record is created after the query result is generated.

In one embodiment of the present invention, the auditing condition includes a condition for a field within the relational database system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Distributed Computing System

Figure 1:
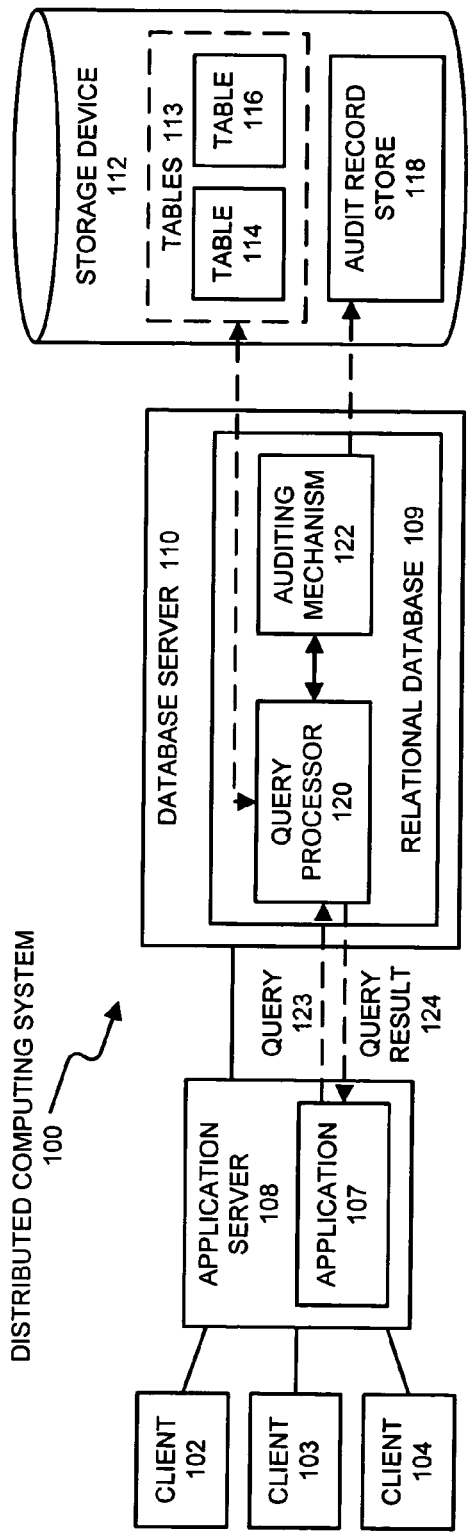
FIG. 1 illustrates a distributed computing system in accordance with an embodiment of the present invention.

FIG. 1 illustrates a distributed computing system 100 in accordance with an embodiment of the present invention. Distributed computing system 100 includes a number of computer systems (nodes), including clients 102–104, application server 108 and database server 110. Computer systems 102–104, 108 and 110 can generally include any type of computer system, including, but not limited to, a computer system based on a microprocessor, a mainframe computer, a digital signal processor, a personal organizer, a device controller, and a computational engine within an appliance.

Computer systems 102–104, 108 and 110 are coupled together by a computer network (not shown). This computer network can include any type of wire or wireless communication channel capable of coupling together computing nodes. This includes, but is not limited to, a local area network, a wide area network, or a combination of networks. In one embodiment of the present invention, this network includes the Internet.

Clients 102–104 can include any node on a network including computational capability and including a mechanism for communicating across the network. In the embodiment of the present invention illustrated in FIG. 1, clients 102–104 communicate with application 107 located on application server 108. Application 107 in turn communicates with relational database 109 on database server 110. Application server 108 and database server 110 can include any node on a computer network including a mechanism for servicing requests from a client for computational and/or data storage resources. Note that application server 108 serves as a client for database server 110.

Database server 110 contains relational database 109. Relational database 109 can generally include any type of database system designed around relation tables. Within relational database 109 there exist a number of mechanisms, including query processor 120 and auditing mechanism 122. Query processor 120 operates on a number of relational tables 113, including table 114 and table 116. Auditing mechanism 122 records audit records to audit record store 118.

Note that tables 113 and audit record store 113 reside on storage device 112, which is controlled by database server 110. Storage device 112 can include any type of non-volatile storage device, such as non-volatile storage devices based on magnetic, optical and/or magneto-optical storage devices. Storage device 112 can also include non-volatile semiconductor storage devices based on flash memory or battery-backed up random access memory. Note that copies of selected portions of tables 113 and audit record store 118 can also exist within memory in database server 110.

Table Structure

Figure 2:
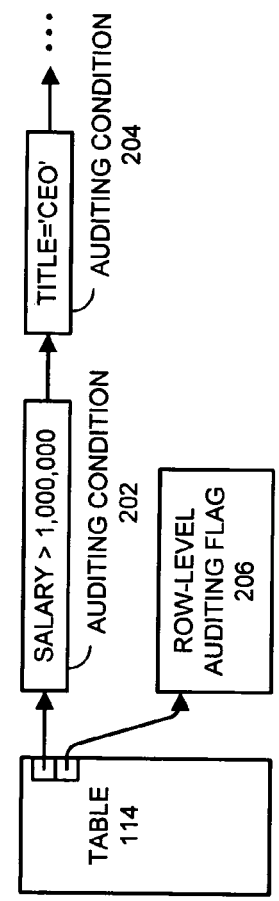
FIG. 2 illustrates a table within a relational database in accordance with an embodiment of the present invention.

FIG. 2 illustrates the structure of table 114 within relational database 119 in accordance with an embodiment of the present invention. Table 114 has the same structure as a typical table in a relational database, including a number of rows containing various fields.

Table 114 also includes a row-level auditing flag 206 which indicates whether auditing is enabled for the table. In another embodiment of the present invention, the system includes a database-wide row-level auditing flag, which enables row-level auditing for the entire relational database 109.

Table 114 is additionally associated with a number of auditing conditions, including auditing condition 202 "salary>1,000,000" and auditing condition 204 "title='CEO'". Auditing conditions 202 and 204 instruct relational database 109 to create an audit record for any rows that are accessed within table 114 that include a salary field with a value greater than 1,000,000, or that include a title field specifying a CEO. Accesses to other rows in table 114 that do not satisfy either of these auditing conditions do not cause an audit record to be generated.

Process of Auditing a Query

Figure 3:
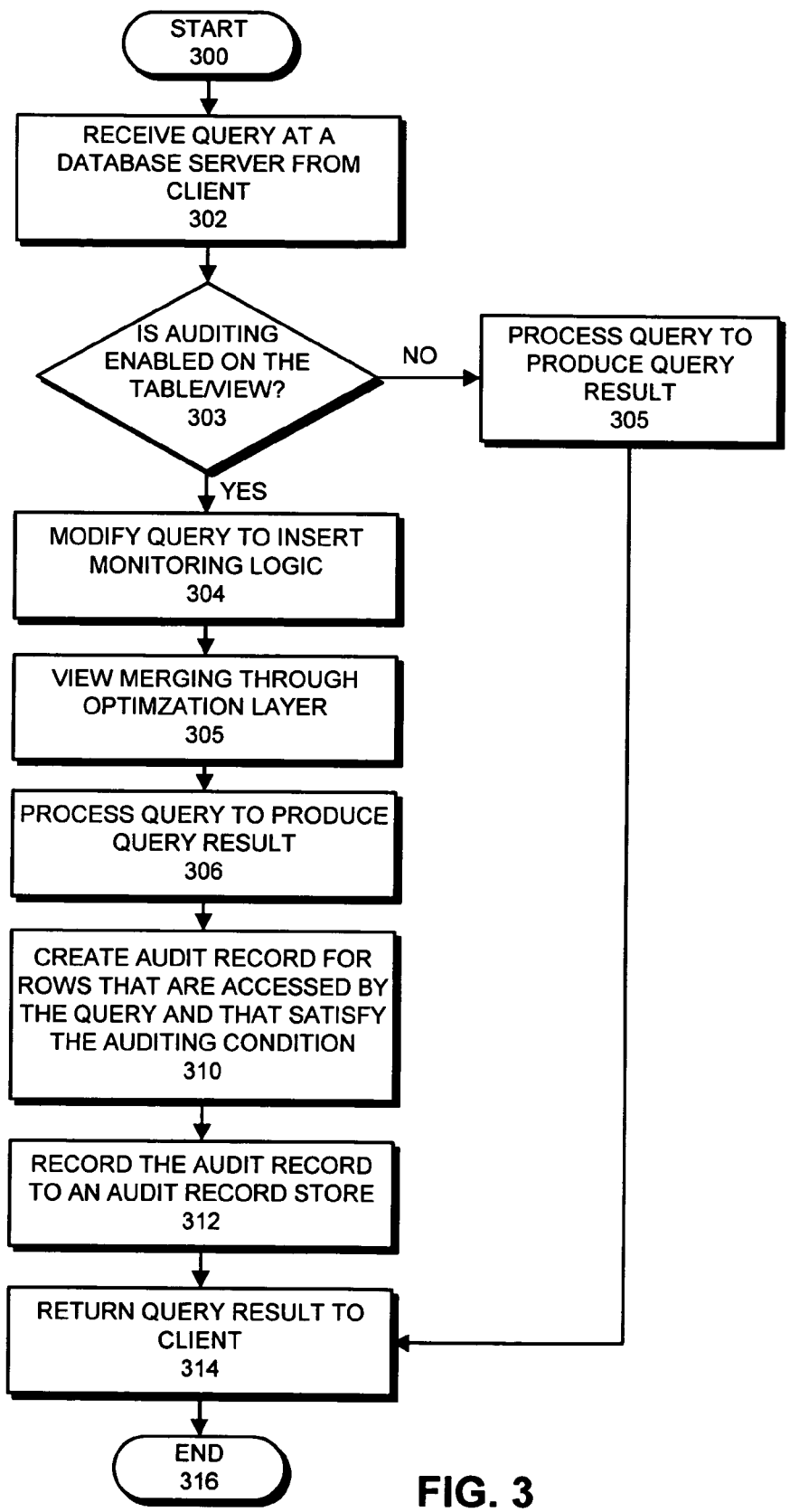
FIG. 3 is a flow chart illustrating the process of auditing a query in accordance with an embodiment of the present invention.

FIG. 3 is a flow chart illustrating the process of auditing a query in accordance with an embodiment of the present invention. The system starts by receiving a query 123 at relational database 109 within database server 110 from application 107 within application server 108 (step 302).

The system first determines if auditing is enabled by checking all tables referenced by the query to see if an auditing flag is set for the tables (step 303). If auditing is not enabled, the system processes query 123 as usual to produce a query result 124 (step 305), and then returns query result 124 (step 314).

If auditing is enabled, the system modifies the query by inserting monitoring logic into query 123 (step 304). This monitoring logic causes an audit record to be created and recorded for any rows that satisfy an auditing condition.

In one embodiment of the present invention, query 123 is modified by inserting statements into query 123 to make query 123 call a function that creates and records auditing records if a row in a table satisfies the auditing conditions.

In another embodiment of the present invention, modifying query 123 involves creating two separate queries. A first query additionally includes restrictions based on the auditing conditions. This query produces audit records only for rows that satisfy the auditing conditions. A second query is unmodified from the initial query and is used to produce the query result.

In one embodiment of the present invention, the auditing condition is specified for the entire relational database 109. In another embodiment, the auditing condition is specified on a table-by-table basis.

Next, the optimization layer performs view merging (step 305), and the system processes query 123 to produce the query result 124 (step 306). In doing so, the system creates an audit record for rows that are accessed by query 123 and that satisfy the auditing condition (step 310). Alternatively, the audit record can be produced by running a second query at a later time to produce the audit record.

Note that the audit record includes a user name for a user making the query, a time stamp specifying a time of the query, a text of the query and specific variable bindings for the query.

The system then records the audit record in audit record store 118 (step 312) and then returns the query result 124 to application 107 (step 314).

Process of Reforming a Query

Figure 4:
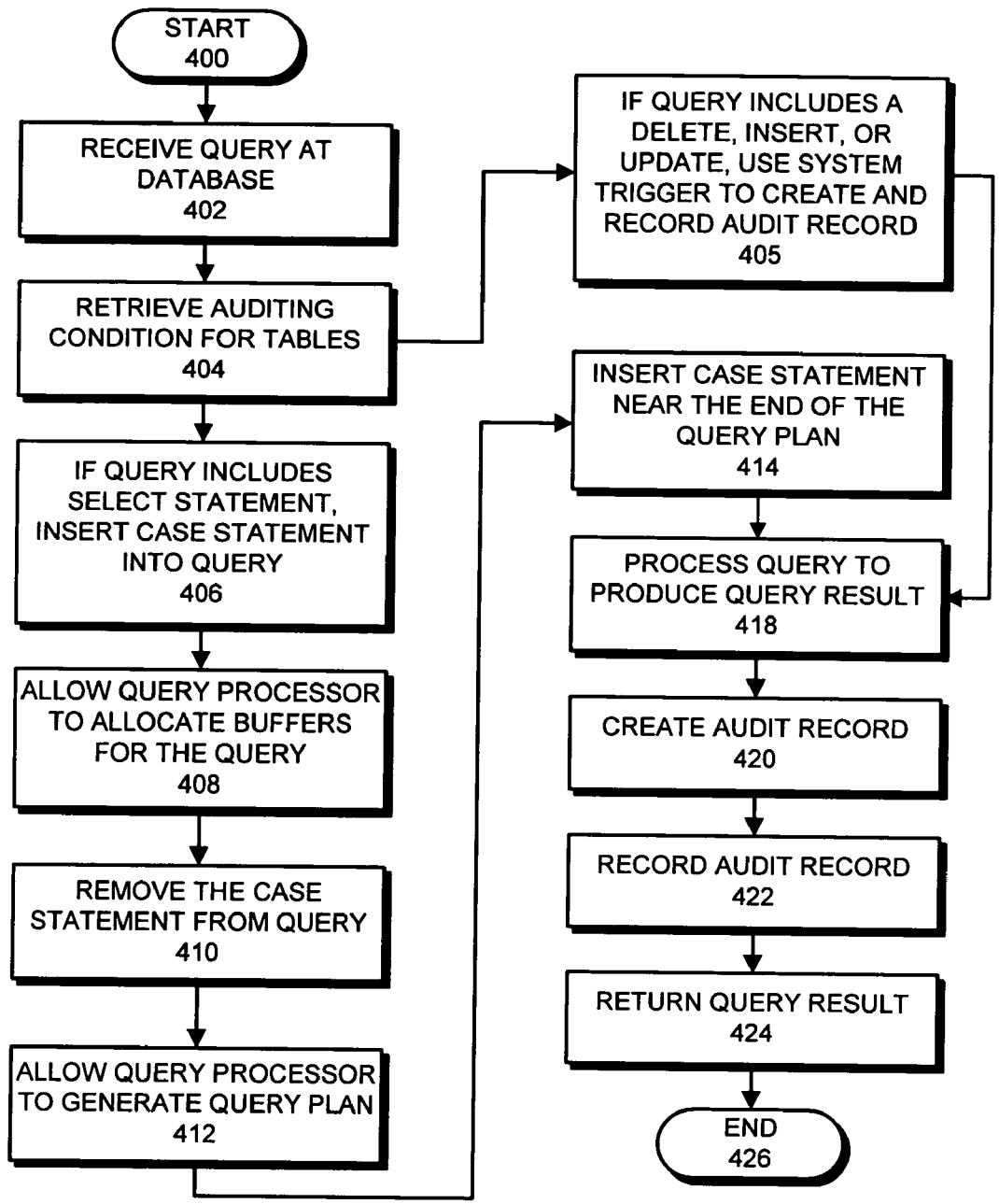
FIG. 4 is a flow chart illustrating the process of reforming a query for auditing purposes in accordance with an embodiment of the present invention.

FIG. 4 is a flow chart illustrating the process of reforming a query for auditing purposes in accordance with an embodiment of the present invention. The system starts by receiving a query 123 at relational database 109 (step 402). The system next retrieves any auditing conditions that might exist for tables involved in query 123, such as auditing conditions 202 and 204 associated with table 114 (step 404).

If query 123 includes a statement that modifies a table within relational database 109, such as a delete statement, an insert statement or an update statement, the system uses pre-existing triggers in the database system to create audit records for these statements (step 405). Note that a database system generally maintains a log of changes to database tables, so providing an auditing mechanism for these changes in addition to the log may be unnecessary. The system then processes query 123 to produce query result 124 (step 418).

If query 123 includes a select statement, the system appends a case statement to query 123 for each auditing condition using a view expansion mechanism (step 406). For example, suppose that the auditing condition is DEPT='SALES' and that query 123 is, SELECT*FROM payroll WHERE salary>150,000;

The system appends a case statement to the select statement as follows.

```
SELECT * FROM
(
    SELECT * FROM payroll
    WHERE (CASE WHEN (dept= 'sales') THEN SYS_AUDIT( )
    ELSE NOT NULL END) IS NOT NULL;
)
WHERE salary > 150,000
```

In this example, the case statement will cause the SYS_AUDIT( ) function to be called if the auditing condition is satisfied. This SYS_AUDIT( ) function causes an audit record to be created and recorded.

Note that the function SYS_AUDIT( ) always returns NOT NULL (unless an error condition arises within SYS_AUDIT( ). Therefore the predicate is always evaluated as TRUE. Hence, the predicate does not affect the logic of query 123, and the predicate can be safely applied to query 123.

Next, the query processor is allowed to allocate buffers for query 123 (step 408). After the buffers are allocated, the system removes the case statement from query 123 (step 410). In one embodiment of the present invention, this involves moving a query filter list data structure that refers to the predicate to a temporary location in the query block data structure that contains all the meta-information for query 123. Moving the predicate in this way prevents the optimizer from reorganizing the CASE clause and query plan layer to allocate row source for the CASE clause.

After optimization, the system generates a query plan for query 123 to specify an order in which the operations involved in query 123 are carried out (step 412).

After the query plan is generated (but before generating the execution plan for any "GROUP BY" clause that may exist) the system generates an execution plan for the case statement so that the case statement is evaluated only for rows that satisfy all the preceding conditions in query 123 (step 414). In this way, an audit record is created only for rows are accessed by query 123. Next, the system processes query 123 to produce query result 124 (step 418). This causes an audit record to be created (step 420) and recorded (step 422) for each row that satisfies the conditions of query 123 as well as the auditing conditions.

Finally, the system returns query result 124 to the entity that issued query 123 (step 424).

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for selectively auditing accesses to a relational database system comprising:
    receiving a query from a client at a database server that process queries for the relational database system, wherein the relational database system comprises a plurality of relational tables, wherein each of the relational tables includes an auditing flag which indicates whether auditing is enabled for the relational table;
    determining if auditing enabled by checking the auditing flag;
    if so, automatically modifying the query prior to processing the query, so that processing the query causes an auditing record to be created and recorded only for selected rows in relational tables that are accessed by the query and satisfy an auditing condition, wherein the auditing condition specifies selecting a row based on the value of a field in the row in the relational database;
    processing the query at the database server to produce a query result; conditionally creating the audit record only for rows in relational tables that are actually accessed by the query and that satisfy the auditing condition;
    recording the audit record in an audit record store; and
    returning the query result to the client.

2. The method of claim 1, wherein the auditing condition is associated with a table in the relational database system.

3. The method of claim 1, wherein the auditing condition includes a plurality of auditing conditions.

4. The method of claim 1, wherein the audit record includes:
    a user name for a user making the query;
    a time stamp specifying a time of the query; and
    a text of the query.

5. The method of claim 1, wherein the audit record is created while the query result is being generated.

6. The method of claim 1, wherein the audit record is created after the query result is generated.

7. The method of claim 1, wherein the auditing condition includes a condition for a field within the relational database system.

8. The method of claim 1, wherein creating the audit record includes:
    determining if auditing is enabled; and
    creating the audit record if auditing is enabled.

9. The method of claim 8, wherein auditing is enabled on a table by table basis.

10. A computer-readable medium storing instructions that when executed by a computer cause the computer to perform a method for selectively auditing accesses to a relational database system, the method comprising:
    receiving a query from a client at a database server that processes queries for the relational database system, wherein the relational database system comprises a plurality of relational tables, wherein each of the relational tales includes an auditing flag which indicates whether auditing is enabled for the relational table;

determining if auditing is enable by checking the auditing flag;

if so, automatically modifying the query prior to processing the query, so that processing the query causes an audit record to be created and recorded only for selected rows in relational tables that are accessed by the query and that satisfy an auditing condition, wherein the auditing condition specifies selecting a row based on a value of a field in the row in the relational database;

processing the query at the database server to produce a query result;

conditionally creating the audit record only for rows in relational tables that are actually accessed by the query and satisfy the auditing condition;

recording the audit record in an audit record store; and returning the query result to the client.

11. The computer-readable storage medium of claim 10, wherein the auditing condition is associated with a table in the relational database system.

12. The computer-readable storage medium of claim 10, wherein the auditing condition includes a plurality of auditing conditions.

13. The computer-readable storage medium of claim 10, wherein the audit record includes:
a user name for a user making the query;
a time stamp specifying a time of the query; and
a text of the query.

14. The computer-readable storage medium of claim 10, wherein the audit record is created while the query result is being generated.

15. The computer-readable storage medium of claim 10, wherein the audit record is created after the query result is generated.

16. The computer-readable storage medium of claim 10, wherein the auditing condition includes a condition for a field within the relational database system.

17. The computer-readable storage medium of claim 10, wherein creating the audit record includes:
determining if auditing is enabled; and
creating the audit record if auditing is enabled.

18. The computer-readable storage medium of claim 17, wherein auditing is enabled on a table by table basis.

19. An apparatus that selectively audits accesses to a relational database system, comprising:
a database sever;
a receiving mechanism, at the database server, that is configured to receive a query from a client, wherein the database server processes queries for the relational database system, wherein the relational database system comprises a plurality of relational tables, wherein each of the relational tables includes an auditing flag which indicates whether auditing is enabled for the relational table;
a determining mechanism that is configured to determine if auditing is enable by checking the auditing flag;
a query modification mechanism that is configured to modify the query prior to processing the query, so that processing the query causes an audit record to be created and recorded only for selected rows in relational tables that are accessed by the query and that satisfy an auditing condition, wherein the auditing condition specifies selecting a row based on a value of a field in the row in the relational database;
a query processor that is configured to process the query at the database server to produce a query result;
an auditing mechanism that is configured to,
conditionally create the audit record only for rows in relational tables that
are actually accessed by the query and satisfy the auditing condition,
and to record the auditing record in an audit record store; and
a returning mechanism that returns the query result to the client.

20. The apparatus of claim 19, wherein the auditing condition is associated with a table in the relational database system.

21. The apparatus of claim 19, wherein the auditing condition includes a plurality of auditing conditions.

22. The apparatus of claim 19, wherein the audit record includes:
a user name for a user making the query;
a time stamp specifying a time of the query; and
a text of the query.

23. The apparatus of claim 19, wherein the auditing mechanism is configured to create the audit record while the query result is being generated.

24. The apparatus of claim 19, wherein the auditing mechanism is configured to create the audit record after the query result is generated.

25. The apparatus of claim 19, wherein the auditing condition includes a condition for a field within the relational database system.

26. The apparatus of claim 19, wherein the auditing mechanism is configured to:
determine if auditing is enabled; and to
create the audit record if auditing is enabled.

27. The apparatus of claim 26, wherein the auditing mechanism is configured to enable auditing on a table by table basis.

* * * * *